Patented Mar. 24, 1936

2,035,152

UNITED STATES PATENT OFFICE 2,035,152

CONCENTRATED AQUEOUS SOLUTIONS OF THE FOLLICULAR HORMONE

Franz Elger, Basel, Switzerland, assignor to Hoffmann-La Roche Inc., Nutley, N. J., a corporation of New Jersey No Drawing. Application April 18, 1935, Serial No. 17,139. In Germany May 17, 1934

2 Claims. (Cl. 167—74)

Owing to the exceedingly reduced solubility of the follicular hormone in water (Zeitschrift für Physiologische Chemie, vol. 223, 1934, page 149) it has so far been impossible to obtain aqueous solutions of sufficient concentration for injections and for oral administration.

Attempts have been made to remove this obstacle by esterifying the hormone with di-basic acids and thus converting it into water-soluble salts. This way of obtaining more concentrated hormone solutions has however the disadvantage of requiring chemical reactions.

It has now been found that in a simple manner clear, aqueous solutions of the follicular hormone of sufficient concentration for therapeutic use may be obtained by adding resorcinol to the water used for the solution. Thus clear solutions are obtained, which can be filtered and sterilized without decomposition. By adding other suitable phenols the dissolving capacity of the resorcinol may be still further increased.

*Example*

0.1 part by weight of the crude crystallizate of follicular hormone with a titre of about 6 millions mouse units per gram is shaken mechanically for several hours with 200 parts by weight of an aqueous 15% solution of resorcinol. The small insoluble part is removed by centrifuge and the product then filtered through hardened filter paper. A clear solution is obtained with about 3000 mouse units per ccm.

I claim:

1. A concentrated aqueous solution of the follicular hormone, consisting in a solution of the hormone in aqueous resorcinol solutions.

2. A concentrated aqueous solution of the follicular hormone, consisting in a solution of the hormone in an aqueous 15% solution of resorcinol.

FRANZ ELGER.